United States Patent [19]

Volz et al.

[11] Patent Number: 4,549,813

[45] Date of Patent: Oct. 29, 1985

[54] APPARATUS FOR MIXING A SOLUTION

[75] Inventors: Hartwig Volz, Celle; Egon Willmann, Hamburg, both of Fed. Rep. of Germany

[73] Assignee: Deutsche Texaco Aktiengesellschaft, Hamburg, Fed. Rep. of Germany

[21] Appl. No.: 624,544

[22] Filed: Jun. 26, 1984

Related U.S. Application Data

[63] Continuation of Ser. No. 325,612, Nov. 27, 1981, abandoned.

[30] Foreign Application Priority Data

Dec. 2, 1980 [DE] Fed. Rep. of Germany ....... 3045383

[51] Int. Cl.[4] .............................................. F16K 19/00

[52] U.S. Cl. .................................... 366/160; 137/897; 366/167; 366/182

[58] Field of Search ............... 137/891, 895, 896, 898; 366/167, 169, 336, 160, 173, 182

[56] References Cited

U.S. PATENT DOCUMENTS

| | | | |
|---|---|---|---|
| 2,325,242 | 7/1943 | Gordon | 137/895 |
| 3,257,180 | 6/1966 | King | 137/891 X |
| 3,482,520 | 12/1969 | Larsen | 366/169 X |
| 3,507,626 | 4/1970 | Van Horn | 366/336 X |
| 3,693,656 | 9/1972 | Saver | 366/167 |
| 3,735,778 | 5/1973 | Garnier | 137/896 |
| 4,075,296 | 2/1978 | Orsini | 137/891 X |
| 4,178,134 | 12/1979 | Babish | 137/895 X |
| 4,274,749 | 6/1981 | Lake | 366/173 X |

FOREIGN PATENT DOCUMENTS

| | | | |
|---|---|---|---|
| 2234487 | 7/1972 | Fed. Rep. of Germany | 137/896 |
| 198445 | 6/1923 | United Kingdom | 366/167 |

*Primary Examiner*—Robert G. Nilson

*Attorney, Agent, or Firm*—Robert A. Kulason; Robert B. Burns

[57] ABSTRACT

Mixing apparatus for a plurality of liquids and including an elongated passage for carrying one of said liquids to a mixing chamber. Said passage includes check valve means which opens into a distribution head which in turn forms a multiplicity of lateral streams. The second fluid is introduced to the mixing compartment by way of an inlet chamber which establishes an annular flow in a direction normal to the flow of the laterally exiting streams. The combined mixture is then discharged through a progressively constricted turbulence chamber.

6 Claims, 4 Drawing Figures

APPARATUS FOR MIXING A SOLUTION

This is a continuation of application Ser. No. 325,612, filed Nov. 27, 1981, now abandoned.

BACKGROUND OF THE INVENTION

The invention relates to an apparatus for mixing a solution of concentrates, particularly of water and liquid polymers. Such aqueous solutions are useful for many applications including the tertiary recovery of petroleum from a subterranean reservoir to enhance production of the latter. Said mixing apparatus comprises primarily a metering chamber into which flowing water, and a flowing concentrate, are brought together in controlled amounts to be mixed.

Polymers, particularly for the tertiary recovery of crude oil from a well or bore, are for example copolymers of acrylamide and sodium acrylate, polyacrylamideacrylates, hereinafter referred to as PAA. As so-called emulsion polymers, such materials comprise for example a high-concentration aqueous solution, which is emulsified in petroleum in the form of small gel particles. The latter usually have a size of 1 to 2 m. Depending on the manufacturer, the proportions of the individual chemicals within a mixture are about 25% to 35% of PAA, 30% to 35% of water, and 30% to 50% of petroleum. A small amount of an emulsion-stabilizing surface-active material can also be included in the mixture.

In the tertiary recovery of crude oil from a well or subterranean reservoir, the PAA with a molecular weight of 3 to 10 millions are added to the injection water at a concentration of normally 0.3 to 1 kg/m$^3$ of water. For such application it is essential that the polymer solution resulting from the mixing of the PAA emulsion with water, be completely free of undissolved or gel-like particles. The presence of particulate matter in the polymer solution could permanently clog the well face or the formation and would thus, over an extended period of time, inhibit injection of the polymer solution.

With respect to the usual preparation of readily injectable solutions, i.e. solutions free of obstructing gel particles, the moment of initial contact between the polymer emulsion and the water is particularly critical. If the emulsion is brought into contact with the water without special precautionary measures, the emulsion will slowly break from oil external to water external.

The gel particles thus suspended in the petroleum will stick together and form large aggregates with a high local polymer concentration. Once such aggregates have formed it is virtually impossible to redissolve them. Even if they are treated for several days by strong agitation they resist being dissolved. Such a solution therefore cannot be injected into a well.

In field operations, actual preparation of a polymer solution for injection into the substrate about a well is usually achieved by metering the liquid polymer into a rapidly flowing stream of water. This form of preparation is realized however only by accepting a number of concurrent disadvantages including the following:

1. The optimum flow rate of the flood water, and the optimum geometrical arrangement of the polymer metering location, are not accurately obtained.

2. It is frequently necessary, depending on the character of the subterranean formation, to vary injection rates in the course of a project. This could result in polymer solutions that are difficult to inject.

3. Towards the termination of the polymer injection stage it is usual to perform a step-wise reduction in the polymer solution concentration. Experience has shown that in such an instance the polymer solution will become less amenable to being injected.

It is an object of the invention therefore to provide an apparatus which fosters the preparation of an aqueous polymer solution which is characterized by its ability to be readily injectable into a substrate to enhance tertiary recovery from the latter. A further object is to provide an apparatus for mixing a plurality of elements to form a substantially homogenous solution.

In accordance with the invention the above-specified objects are achieved through use of an apparatus as hereinafter described. Said apparatus comprises in brief an elongated body having a main passage which operably receives a plunger or piston. The body includes means to receive a stream of a first liquid such as water into the main passage. The plunger includes means to controllably inject a flow of a second fluid such as the above mentioned PAA into said main passage whereby the two injected fluids will be thoroughly mixed.

A turbulence chamber formed in said main passage further enhances homogenization of the respective liquids into a uniform usable composition.

A metering head formed at the plunger inner end is spaced from contiguous walls of the body main passage to define a constricted, annular mixing compartment. Said metering head is provided with a distribution space or chamber in which a flow check valve means is positioned. A plurality of egress ports formed in the periphery of said distribution chamber, cause liquid to be injected laterally from the chamber and into the rapidly flowing stream of liquid in the constricted annular mixing compartment.

The disclosed apparatus offers the physical advantage that initially formed polymer solution will be subjected to strong turbulent action immediately after the PAA has been intermixed with the water stream in the mixing compartment. In such manner, each polymer gel particle will be individually wetted by the water and thus dissolved. The formation of larger aggregates with a high polymer concentration will thereby be prevented.

A further feature of the invention is illustrated by the size of the annular mixing compartment passage through which the water flow is passed. Said passage is reduced in cross-section normal to the liquid flow, downstream of the point where polymer fluid is added to the water flow. Preferably, this abrupt reduction in flow passage size is provided by the metering head terminating downstream of the PAA flow egress ports. Advantageously, the end of the metering head is chamfered to assure an area of turbulence.

A relatively high fluid flow rate is achieved in the region of the mixing compartment egress ports due to the constricted annular cross-section at this point. This flow rate is thereafter drastically reduced at a point immediately downstream of the metering head. The arrangement will result in establishment of a strong turbulence area, and a further homogenization of the polymer solution.

A further feature of the invention resides in the diameter of the turbulence compartment outer wall which gradually decreases at a uniform rate from approximately the region of the egress ports. As a result of the decrease in diameter, the flow rate of homogenized polymer solution will again be increased prior to being discharged through the apparatus outlet port.

In another feature of the invention the polymer concentrate supply passages extend axially through the plunger. The latter is longitudinally adjustable in the body to thereby permit the cross-section of the mixing compartment to be rapidly altered as needed.

Figure 1:
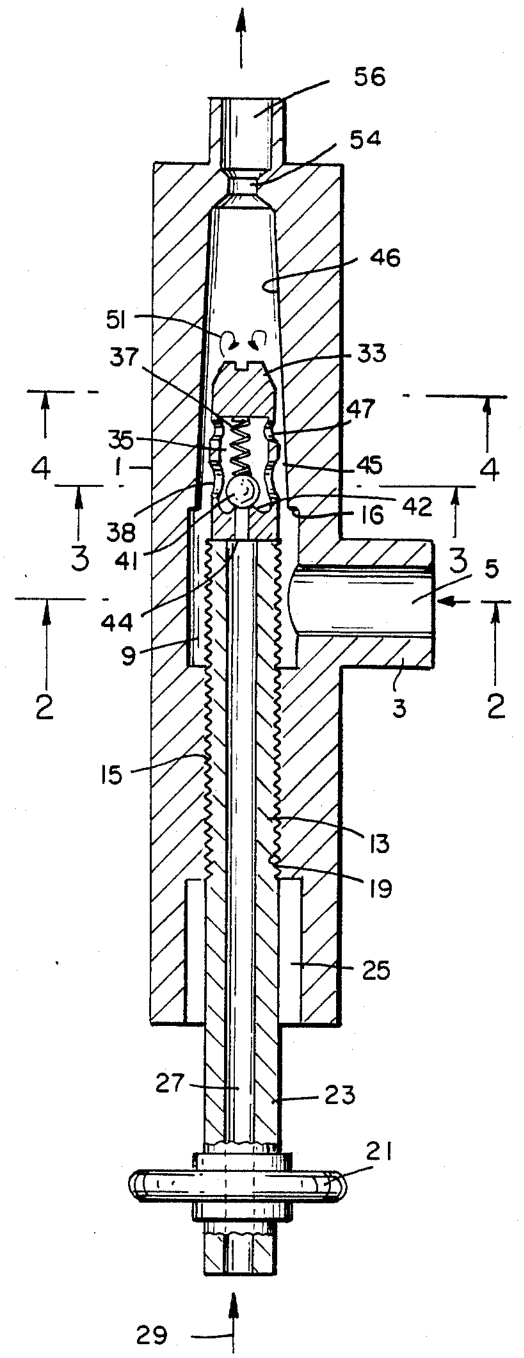
FIG. 1 is a cross-sectional view of the disclosed apparatus.
Figure 2:
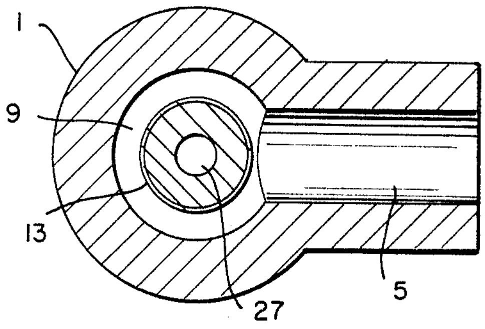
FIG. 2 is a cross-sectional view taken along line 2—2 of FIG. 1.
Figure 3:
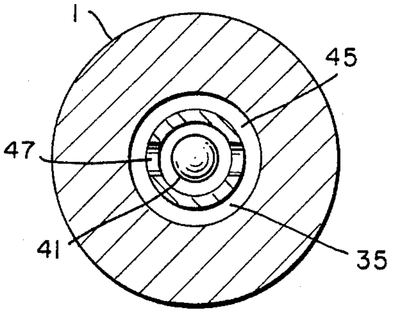
FIG. 3 is a cross-sectional view taken along line 3—3 of FIG. 1.
Figure 4:
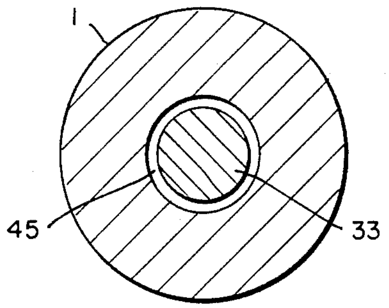
FIG. 4 is a cross-sectional view taken along line 4—4 of FIG. 1.

A preferred embodiment of the invention will be described hereinafter in detail with reference to the illustration thereof shown in the figures.

Elongated tubular body 1 is provided with a central passage 19 as well as with a side flange 3. The latter includes a central bore 5 through which a first liquid such as water can be introduced from a pressurized source thereof, into metering chamber 9.

Said chamber 9 is generally annular in shape being defined by the peripheral walls of said chamber, and the adjacent inner walls of plunger 13. Thus, entering water is caused to flow and swirl about chamber 9 prior to passing toward the open end thereof at the shoulder 16.

Plunger 13 operably projects from one end of central passage 19, and can be adjusted to move reciprocally and rotatably through body 1. A portion of plunger 13 is thus provided with an external thread 15 to engage a corresponding internal screw thread formed within central passage 19.

Plunger 13 is movably retained within body 1 by the threaded connection such that the plunger can be axially adjusted as needed to alter the disposition of annular mixing passage 45.

By rotating hand wheel 21 at the remote end 23 of plunger 13, the latter can be advanced or retracted within body in a longitudinal direction. A packing member 25 interposed between plunger 13 and body 1 forms a fluid tight annular seal.

Central passage 27 of plunger 13 is communicated with a pressurized source of the liquid polymer (PAA). Polymer flow moves in the direction of arrow 29 through passage 27, and subsequently into mixing passage 45. The upper end of plunger 13 is provided with a metering head 33 which defines a distributing space 35 therein.

Check valve means 38 within distributor space 35 is comprised of a compression spring 37 which functions to urge a steel ball 41 toward, and against seat 42 formed at the outlet port 44 of central passage 27. Thus, return flow of liquid into passage 27 is precluded by this valve even if polymer pressure is not maintained.

When the liquid polymer under pressure is urged into passage 27, ball 41 will be displaced from seat 42 within outlet port 41, thereby permitting liquid polymer to enter distributing space 35.

Distribution space 35 is defined by a generally thin walled, cylindrical section which extends coaxially of plunger 13, and is closed by metering head 33. The cylindrical walls are provided with at least one, and preferably with a plurality of egress ports 47 which are spaced both longitudinally and peripherally to form a radiating pattern. Thus, a plurality of pressured streams of PAA are discharged radially outward into the flow of water passing along mixing compartment 45.

Said mixing compartment or passage 45, comprises an annular passage defined by adjacent, but spaced apart walls. Outer wall defines forms an elongated, progressively narrowing passage which terminates at a constricted discharge throat 54.

Said passage or mixing compartment 45 commences at, and communicates with metering chamber 9 to receive a flow of water from the latter. As the water which is normally under pressure swirls about chamber 9, it will form an annular, dynamic stream within mixing compartment 45.

In compartment 45, the cross-sectional area at any point thereof, is governed by the relative longitudinal position of plunger 13 with respect to body 1. Thus, as the plunger is advanced into body 1, metering head 33 will be positioned deeper into turbulence chamber 46, thereby lessening the cross-sectional area of the mixing compartment. As a result, water flow velocity along this mixing compartment segment will be increased.

By optimizing this water flow velocity, the multiple PAA flows which enter laterally into mixing chamber 45, will be better integrated with the water stream to provide a more uniform mixture which flows past metering head 33.

As the mixed flow progresses, it will enter the passage segment adjacent to inwardly tapered face 51. At this point, the flow velocity will be sharply decreased due to the increased cross-sectional area of the section. Thus, a substantial portion of the combined or mixed flow will be subjected to considerable turbulence as it flows along the inwardly tapered face 51 to the forward end of metering head 33. This action will achieve an even more thorough homogenization of water with the additive polymer.

As the now turbulated, and preliminary mixed flow advances toward constricted throat 54, turbulence passage 46 will be decreased in cross-section so that the velocity is again increased prior to reaching the constricted end.

As the mixed flow is forced from turbulence chamber 46 by way of throat 54, the stream will reach its maximum velocity prior to again being expanded and entering downstream chamber 56.

By varying the setting of plunger 13 to thereby vary the cross-sectional area of mixing chamber 45, it is possible to establish an optimum flow rate of water to best intermix with the polymer. Further, the flexibility of adjustment in the apparatus, assures homogeneity in the solutions produced.

We claim:

1. Apparatus for forming at least two liquids into a substantially uniform mixture for delivery thereof through a discharge opening, which apparatus includes;
   - an elongated body (1), means forming a longitudinal bore (19) in said body and including a cylindrical wall portion having at least one inlet (5) communicated with a source of a first liquid, and an inwardly convergent wall section downstream of the cylindrical wall portion,
   - an elongated plunger (13), operably positioned in said longitudinal bore (19), being threadably rotatable in said bore (19) to adjust the longitudinal relationship of said plunger (13) with respect to said inwardly convergent wall section, said elongated plunger having an axial passage (27) communicated with a source of a second liquid, and being spaced from said cylindrical wall portion to define an annular metering chamber (9), thereby to form an annular stream of said first liquid, a metering head (33) on said elongated plunger (13), disposed contiguous with the inwardly convergent wall section of said bore (19) to form a convergent wall mixing compartment (45), which is adjustable in cross-section in response to longitudinal movement of said plunger (13) through said bore (19), and a turbulence chamber (46), downstream of said mixing compartment, said metering head (33) including an inner distribution compartment (35) communicated with said axial passage (27), and a plurality of discharge ports (47) therein communicating said distribution compartment (35) with mixing chamber (45) to introduce radial streams of said second liquid into said annular stream of said first liquid, and means in said elongated body (1) forming a discharge opening (54) in said turbulence chamber (46) to conduct the mixture of said at least two liquids therefrom.

2. In the apparatus as defined in claim 1, including; check valve means 38 interposed between said central passage 27, and said distribution space 35 being operable to regulate flow into said distribution space 35.

3. In the apparatus as defined in claim 2, wherein said check valve means 38 is operable to permit unidirectional liquid flow from said passage 27, into said distribution space 35.

4. In the apparatus as defined in claim 2, wherein said check valve means 38 includes; a seat 42 formed at the terminus of said central passage 27, a seal element 41 displaceably received on said seat 42 to form a substantially fluid tight annular seal therewith, and biasing means 37 being operable to urge said seal element 41 in the direction of said seat 42.

5. In the apparatus as defined in claim 1, wherein said plunger 13 is reciprocally received within said elongated body 1, forming a fluid tight joint therewith.

6. In the apparatus as defined in claim 1, wherein said plunger 13 is rotatably received within said body 1, being operable to alter the radial relationship between said metering head 33, and adjacent walls of said mixing compartment 45.

* * * * *